G. O. BAIRD.
MUD SHOE.
APPLICATION FILED DEC. 28, 1921.

1,427,571.   Patented Aug. 29, 1922.

WITNESSES

INVENTOR
GEORGE O. BAIRD
BY
ATTORNEYS

UNITED STATES PATENT OFFICE.

GEORGE O. BAIRD, OF SHREVEPORT, LOUISIANA.

MUD SHOE.

1,427,571. Specification of Letters Patent. Patented Aug. 29, 1922.

Application filed December 28, 1921. Serial No. 525,453.

*To all whom it may concern:*

Be it known that I, GEORGE O. BAIRD, a citizen of the United States, and a resident of Shreveport, in the parish of Caddo and State of Louisiana, have invented a new and Improved Mud Shoe, of which the following is a full, clear, and exact description.

This invention relates to mud shoes for automobiles and has for an object to provide an improved construction which may be readily applied or removed and which, when in use, acts not only to cause the driving wheel of an automobile to grip the ground but in addition, acts as a form of vertical lift.

Another object in view is to provide an auxiliary shoe for an automobile wheel which acts as a gripping and lifting member, the arrangement being such that the gripping and lifting action increases during the rotation of the wheel so as to raise the wheel vertically as well as causing the same to move longitudinally when power is applied to the wheel.

A still further object, more specifically, is to provide a mud shoe for automobile wheels wherein independent metallic boxes or frames are connected together by articulating means so that the various boxes may conform to the shape of the tire while acting in the desired capacity of gripping means.

In the accompanying drawing—

Figure 1:
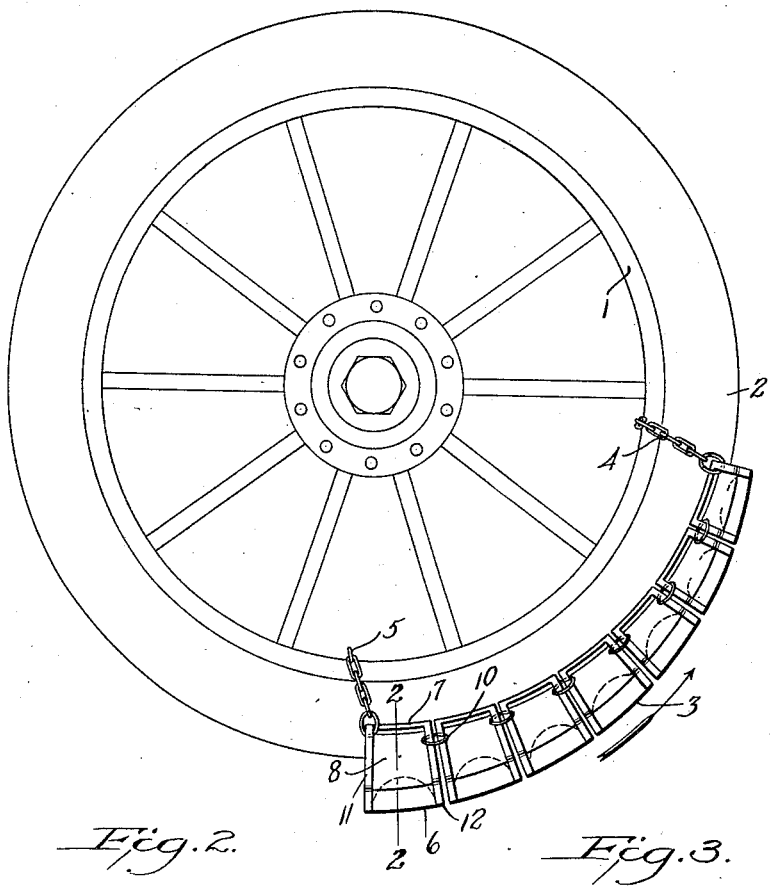
Figure 1 is a side view of a wheel with an embodiment of the invention applied thereto.
Figure 2:
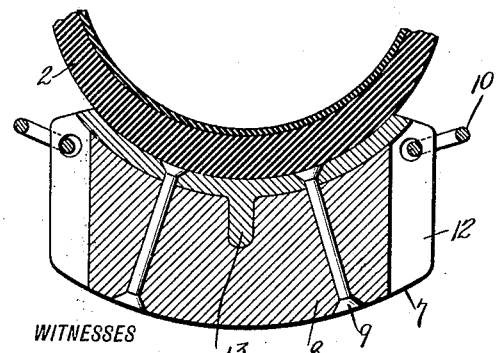
Figure 2 is a sectional view through Figure 1 approximately on line 2—2, the same being on an enlarged scale.
Figure 3:
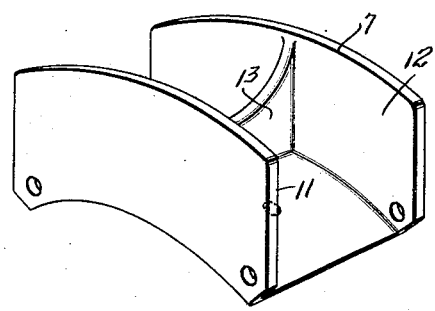
Figure 3 is a detail perspective view of one of the metal boxes shown in Figure 1.

Referring to the accompanying drawing by numerals, 1 indicates an automobile driving wheel provided with a tire 2 of any desired structure. When driving an automobile of any type, it sometimes occurs that a muddy road must be used and occasionally, the driving wheels sink into what may be termed "mud holes" or depressions filled with a mixture of earth and water. When this occurs, the driving wheels of the automobile may be rotated by the engine but will not propel the automobile forward as they will merely spin in the depression. In a case of this kind, it is desired to provide some means for raising vertically the wheel to a certain extent and also causing the wheel to grip the soft earth. In order to carry out this idea, a device embodying the invention may be used wherein a gripping structure or mud shoe 3 is provided which is secured to the wheel by means of suitable chains 4 and 5. It is, of course, evident that other connecting means may be used, as for instance, a rope or strap. The shoe 3 is made from a number of sections 6, said sections being gradually reduced in size from one end of the shoe to the other so as to present a tapering structure. Each of the sections 6 is formed from a box 7 of metal, a filling block 8 of wood or other desired material and suitable rivets or other securing means 9 for holding the blocks 8 in place. The boxes 7 are articulated or pivotally connected together by suitable links 10 loosely fitting in suitable apertures in the side walls or flanges 11 and 12 of the respective boxes. A central bracing partition 13 is provided, said partition being preferably formed at the upper edge arc-shaped so that a single block of wood 8 may extend from near one end to near the other end of the respective boxes 7.

Ordinarily, the shoe 3 is not used during the travel of the automobile but only when the wheels continue to slip or when the power wheels drop into a depression and rotate without driving the automobile. When this occurs, the driver places the shoe 3 in the position, as shown in Figure 1, so that the small section 6 will strike the ground first and, consequently, there will be a gradual and increasing gripping and lifting action so that the automobile is raised several inches and at the same time pushed forward. As soon as the wheel has left the depression or the mud section of the road, it is necessary to remove the shoe 3 as the shoe would be objectionable on an ordinary road.

What I claim is:—

1. A mud shoe of the character described, comprising a plurality of articulated sections, means associated with the outer sections for securing the sections to an automobile tire, each of said sections comprising a metallic box open on one side and at both ends, said box having a central bracing web bracing the bottom and the sides of the box, and a one piece filler provided with a slot at the bottom thereof for accommodating said bracing web, said filler fitting in said box.

2. A mud shoe of the character described comprising a plurality of articulated sections, and means associated with the end sections for securing the articulated sections to an automobile tire, each of said sections comprising a curved metallic box open at one side and both ends, said box having a central, inwardly curved bracing web extending from the bottom and merging into both sides, said web acting as a reenforcing member for said sides and as a key for a filler nested in said box.

GEORGE O. BAIRD.